(12) United States Patent
Ashiura et al.

(10) Patent No.: US 7,196,144 B2
(45) Date of Patent: Mar. 27, 2007

(54) PROCESS FOR MODIFICATION OF POLYMER

(75) Inventors: Makoto Ashiura, Hiratsuka (JP); Tetsuji Kawazura, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 11/091,483

(22) Filed: Mar. 29, 2005

(65) Prior Publication Data

US 2005/0222343 A1  Oct. 6, 2005

(30) Foreign Application Priority Data

| Apr. 1, 2004 | (JP) | ............................ 2004-108986 |
| Oct. 26, 2004 | (JP) | ............................ 2004-311135 |
| Feb. 3, 2005 | (JP) | ............................ 2005-027650 |

(51) Int. Cl.
 *C08C 19/22* (2006.01)
 *C08C 19/25* (2006.01)
 *C08F 8/30* (2006.01)

(52) U.S. Cl. .................... 525/377; 525/374; 525/333.8

(58) Field of Classification Search ................ 525/377, 525/374, 333.8
See application file for complete search history.

(56) References Cited

U.S. PATENT DOCUMENTS

| 4,581,429 | A | * | 4/1986 | Solomon et al. ............. 526/220 |
| 5,919,871 | A | * | 7/1999 | Nicol et al. ............... 525/333.8 |
| 6,084,015 | A | * | 7/2000 | Chino et al. ................ 524/189 |
| 2003/0139536 | A1 | * | 7/2003 | Bertin et al. ................ 525/377 |

FOREIGN PATENT DOCUMENTS

| JP | 05-059253 A1 | 3/1993 |
| JP | 08-239510 A1 | 9/1996 |
| JP | 10-182881 A1 | 7/1998 |
| JP | 2003-524037 A1 | 8/2003 |

* cited by examiner

*Primary Examiner*—Ling-Sui Choi
(74) *Attorney, Agent, or Firm*—Rader, Rishman & Grauer PLLC

(57) ABSTRACT

A process for modification of a polymer comprising modifying a polymer (A) capable of decomposing by carbon radicals present in the molecule thereof using a compound (B) having a nitroxide radical in the molecule thereof and a radical initiator (C) in a ratio of (B)/(C) (molar ratio) of at least 0.7, whereby organic groups derived from the nitroxide radicals are introduced into the polymer and a modified unhalogenated butyl rubber obtained therefrom.

7 Claims, 2 Drawing Sheets

PROCESS FOR MODIFICATION OF POLYMER

BACKGROUND OF THE INVENTION

1. Field of the Invention

The present invention relates to a process for modification of a polymer. More specifically, it relates to a process for modifying a polymer by reacting a polymer capable of decomposing by carbon radicals present in the molecule thereof with a compound having a nitroxide radical in the molecule thereof and a radical initiator.

2. Description of the Related Art

For example, as disclosed in Japanese Unexamined Patent Publication (Kokai) No. 10-182881, it has been proposed to compound stable free radicals such as TEMPO (i.e., 2,2,6, 6-tetramethyl-1-piperidinyloxy radical) into rubber to thereby improve the physical properties of the rubber composition, in particular the processability, the abrasion resistance, etc. Further, Japanese Unexamined Patent Publication (Kokai) No. 8-239510 discloses to incorporate a TEMPO derivative into a polymer to thereby prevent polymer aging. However, these are not technologies for positively causing the generation of carbon radicals in a polymer such as rubber and using a compound having the stable free radicals in the molecule thereof to modify the polymer. A technique for using nitroxide radicals to modify a polymer is described in U.S. Pat. No. 4,581,429, but this introduces nitroxide radicals as counter radicals for living radical polymerization and is not used for the purpose of imparting functional groups to the polymer. Japanese National Patent Publication (Tokuhyo) No. 2003-524037 discloses a reaction with multifunctional nitroxide radicals as reversible cross-linking agents in the presence of free radicals, but this is not used for the purpose of imparting functional groups. Therefore, any technology relating to a method for introducing functional groups into a radical degradation type polymer, while suppressing the decrease in the molecular weight has not yet been found.

Ordinary butyl rubber has an extremely low unsaturated degree, and therefore, is superior in weather resistance, heat resistance, ozone resistance, etc., but conversely has the defect of slow vulcanization. In particular, for sufficient vulcanization with sulfur, use of a high temperature and strong vulcanization accelerator, or vulcanization over a long time, is necessary. Therefore, a halogenated butyl rubber improved in vulcanization activity of unsaturated sites by introducing of chlorine or bromine to allyl positions of the unsaturated sites (i.e., isoprene sites) of butyl rubber has been developed. This enables the co-cross-linkability and bondability with other diene-based rubber to be improved, while maintaining the excellent properties of butyl rubber and is, therefore, being widely used. However, in recent years, various measures have been taken to eliminate use of halogens in development of rubber and elastomers from the environmental viewpoints. If considered from the halogen-free viewpoint, the load of halogenated butyl rubber on the environment is large. Further, since halogenated butyl rubber usually is produced by dissolving butyl rubber in a hydrocarbon solvent, followed by halogenation, the number of production steps is large and the production cost is higher than the ordinary butyl rubber.

Technology for grafting maleic anhydride, etc. to a polypropylene in the presence of an organic peroxide (i.e., PO) is generally used. Japanese Unexamined Patent Publication (Kokai) No. 5-59253 discloses a graft of an epoxy group-containing monomer to a polypropylene. However, according to these methods, a decrease in a molecular weight and gelling of a polypropylene-based polymer occur during the modification. Further, production of a homopolymer by a direct reaction of a functional monomer and initiator is unavoidable.

SUMMARY OF THE INVENTION

Accordingly, the object of the present invention is to modify a butyl rubber or ethylene-propylene copolymer (EPM) or further a thermoplastic polymer including propylene units or other radical decay type polymer by a compound having a nitroxide radical in its molecule so as to introduce functional groups while suppressing a drop in the molecular weight of the polymer.

Another object of the present invention is to provide a butyl rubber not including a halogen, but having a high vulcanization activity.

In accordance with the present invention, there is provided a process for modifying a polymer comprising modifying a polymer (A) capable of decomposing by carbon radicals present in the molecule thereof using a compound (B) having a nitroxide radical in the molecule thereof and a radical initiator (C) in a ratio of (B)/(C) (molar ratio) of at least 0.7, whereby organic groups derived from the nitroxide radicals are introduced into the polymer.

In accordance with the present invention, there is also provided a modified high vulcanization activity butyl rubber obtained by modifying a butyl rubber not containing a halogen with a compound (B) having a nitroxide radical in the molecule thereof.

BRIEF DESCRIPTION OF THE DRAWINGS

The present invention will now be explained in detail with reference to the attached drawings, wherein.

BEST MODE FOR CARRYING OUT THE INVENTION

In this specification and in the claims which follow, the singular forms "a", "an" and "the" include plural referents unless the context clearly dictates otherwise.

According to the present invention, it is possible to introduce the compound (B) into the compound (A) through the nitroxide radicals, while suppressing the decrease in the molecular weight of the polymer (A), that is, it is possible to introduce functional groups, without causing a decrease in the molecular weight of a radical degradation type polymer. Thus, it is possible to improve the bondability with glass, the affinity with a filler, and the compatibility with a thermoplastic resin etc., when blending, without causing a decrease in the inherent physical properties of the polymer (A).

According to the present invention, it was found that, by modifying an ordinary unhalogenated butyl rubber with a compound (B) having a nitroxide radical in the molecule thereof in a mixer, the resultant modified butyl rubber exhibits a vulcanization activity equal to that of a halogenated butyl rubber.

Figure 1:
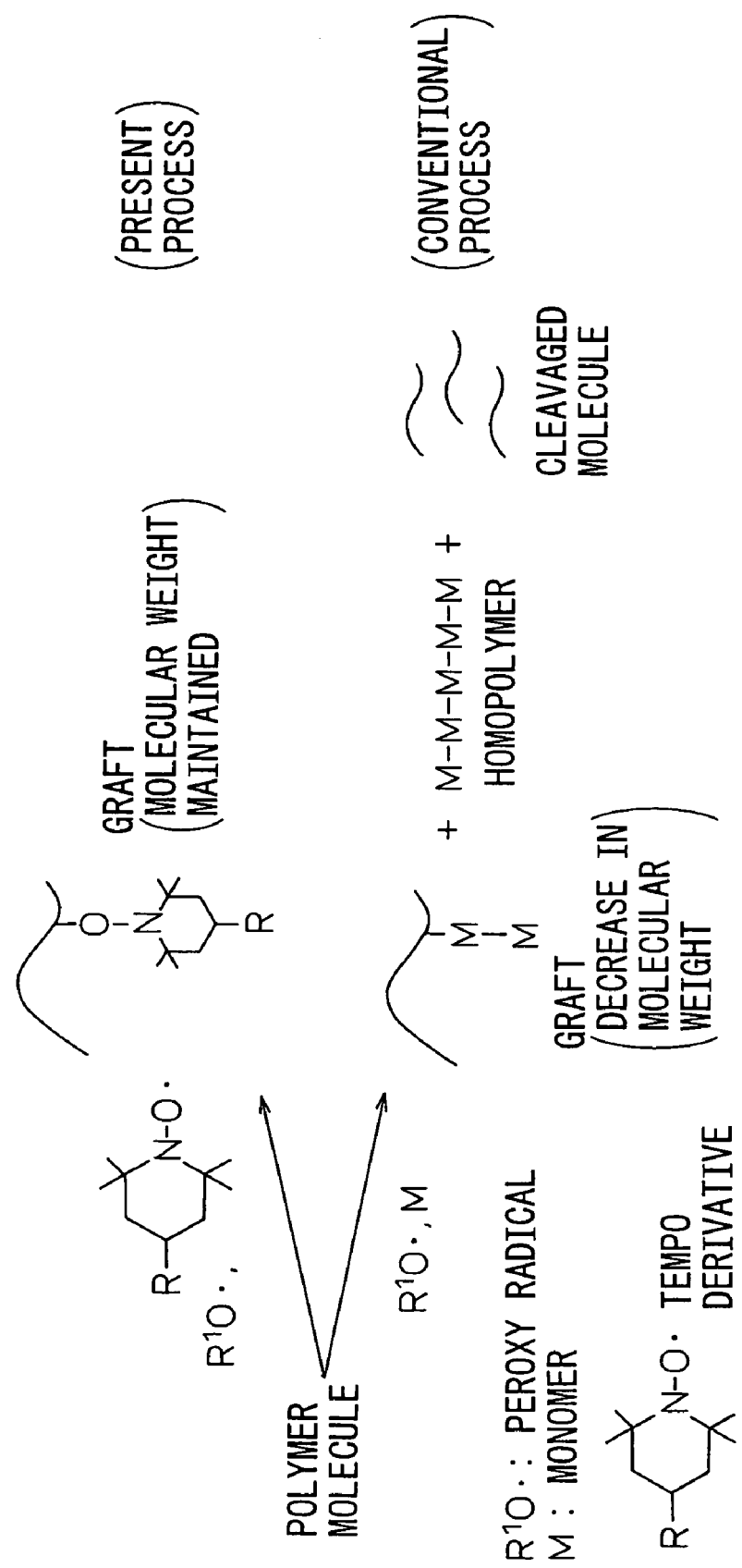
FIG. 1 is conventional methods for introducing functional groups into polymers.

Since rubbers such as butyl rubber, EPM, or thermoplastic resins such as polymers including propylene units have low polarity, they have the defects of low solubilities with resins such as polyamide, polyester and inferior bondability with glass, etc. Therefore, as a method for enhancing the polarity of such low polarity polymers or causing a reaction at their interfaces, the method for introducing functional groups thereto may be mentioned. To introduce functional groups, the technique for the generation of radicals on the molecular chain and reaction with a compound having functional groups is often used, but as shown in FIG. 1, i.e., the conventional chemical methods, since the constituent units of these polymers include units, which decomposes upon removal of the hydrogen from the radicals, the molecular weights of the polymers are likely to extremely decrease during the modification. This decrease in the molecular weight is not preferable, since it has a detrimental effect on the physical properties. Further, radical initiators and compounds having functional groups may directly react together, whereby the decrease in the reaction efficiency or the formation of a homopolymer in the system occur.

On the other hand, in the process of the present invention, as shown schematically in FIG. 1, the inventors engaged in intensive studies of a process for introducing functional groups to a radical degradation type polymer, while suppressing a decrease in the molecular weight and, as a result, found that the above object can be achieved by modification by addition of a nitroxide radical compound (B) composed of stable free radicals superior in carbon radical trapping capability and a radical initiator (C) in the specific ratio.

Compounds having stable free radicals such as TEMPO quickly trap radicals generated by the cleavage of rubber with light, heat, or mechanical action. However, if trying to introduce functional groups into the molecules of a polymer, it is not possible to sufficiently modify the polymer with just a compound having stable free radicals such as TEMPO. Therefore, the inventors succeeded in introducing the desired functional groups into polymer molecules by positively causing the generation of carbon radicals on the polymer molecular chain as shown in FIG. 1, whereby the present invention were completed.

The polymers (A) usable for the modification according to the present invention include, for example, butyl rubber (IIR), brominated butyl rubber, an isobutylene-paramethylstyrene copolymer, a brominated isobutylene-paramethylstyrene copolymer, polyisobutylene, polybutene, an ethylene-propylene three-way copolymer (EPDM), an ethylene-propylene copolymer (EPM), an ethylene-butene copolymer, a polystyrene-based TPE (SEBS, SEPS), a polyolefin-based TPE, a polypropylene or polypropylene copolymer or other polymer including propylene units, a fluororubber, a hydrogenated acrylonitrile-butadiene copolymer rubber (H-NBR), etc.

The compounds (B) containing nitroxide radicals (—N—O·) in the molecule thereof usable in the present invention, include the following compounds. Note that the amounts of these compounds added are preferably 0.1 to 25 parts by weight, based upon 100 parts by weight of the polymer, more preferably 0.5 to 20 parts by weight.

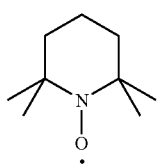

2,2,6,6-Tetramethyl-1-piperidinyloxy (TEMPO)

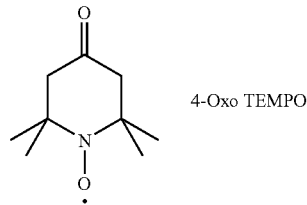

4-Oxo TEMPO

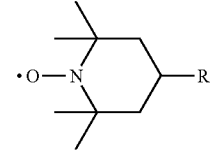

(1)

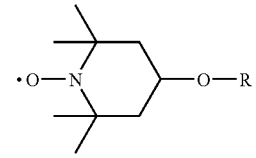

(2)

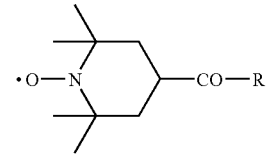

(3)

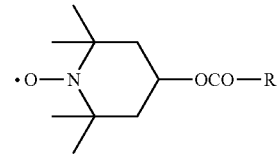

(4)

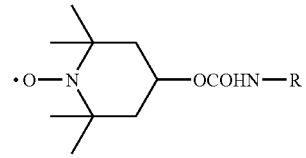

(5)

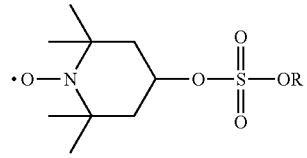

(6)

wherein, in the above formulas (1) to (6), R represents organic groups including a $C_1$ to $C_{30}$ alkyl group, allyl group, amino group, isocyanate group, hydroxy group, thiol group, vinyl group, epoxy group, thiirane group, carboxyl group, carbonyl group-containing group (e.g., cyclic acid anhydrides such as) succinic anhydride, maleic anhydride, glutanic anhydride, phthalic anhydride, functional groups such as an amide group, ester group, imide group, nitrile group, thiocyan group, $C_1$ to $C_{20}$ alkoxy group, silyl group, alkoxysilyl group, nitro group.

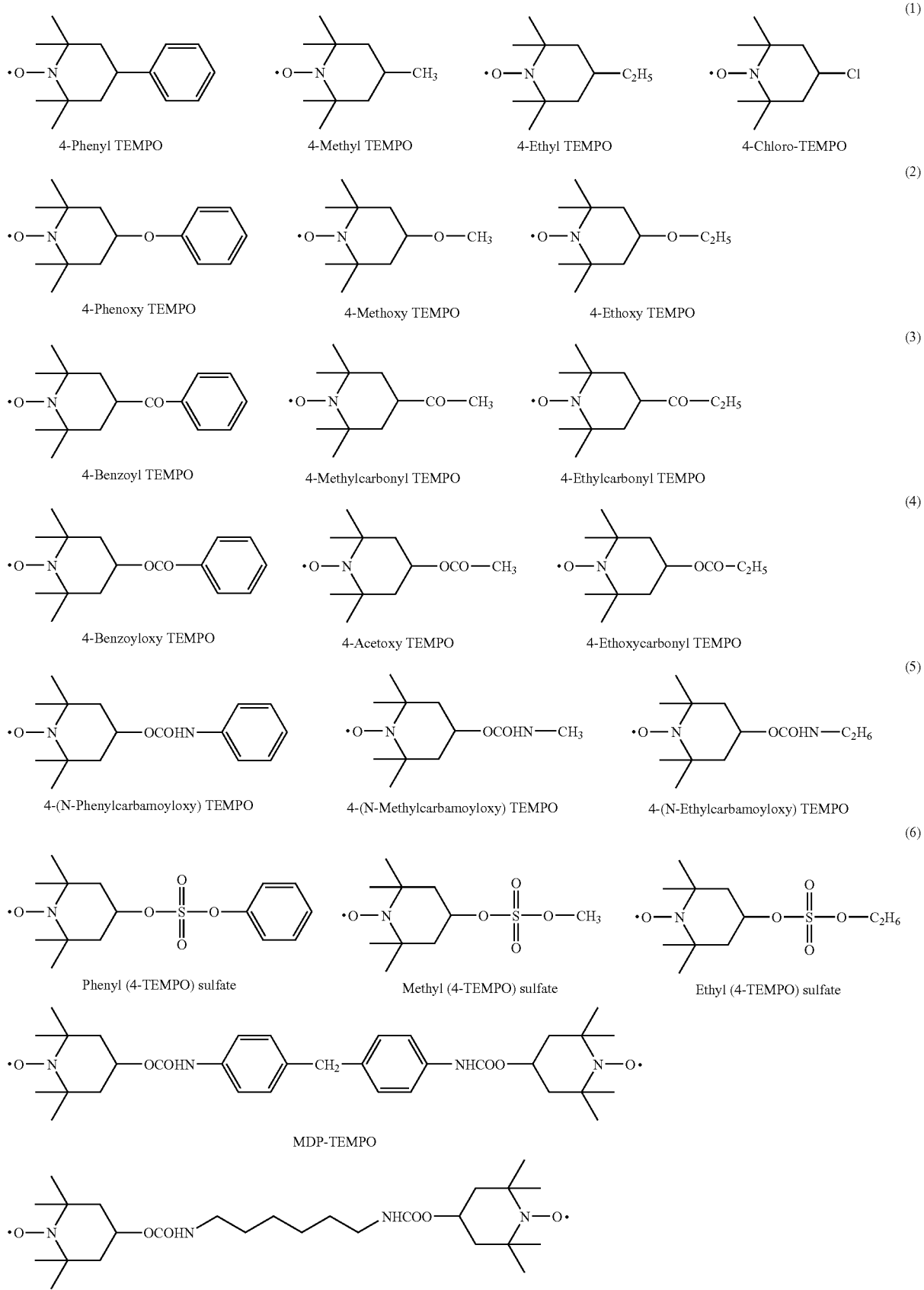

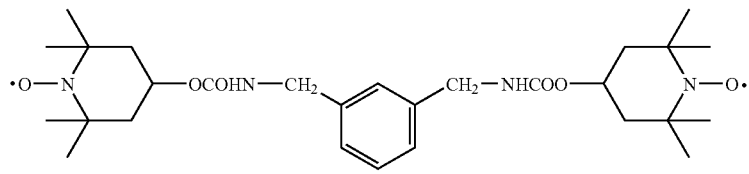
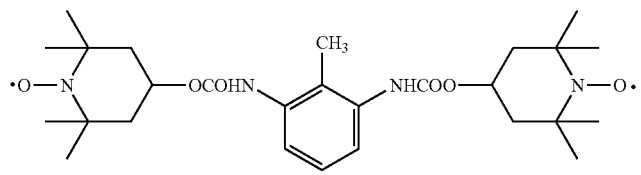
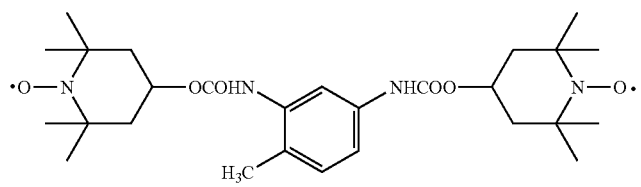
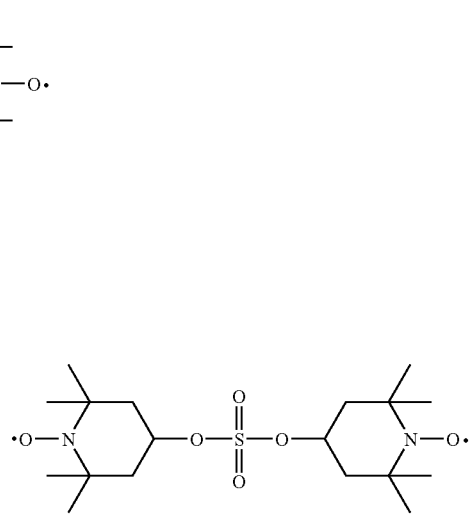
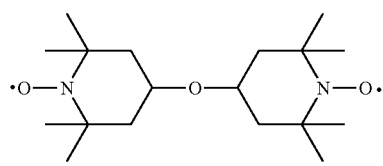
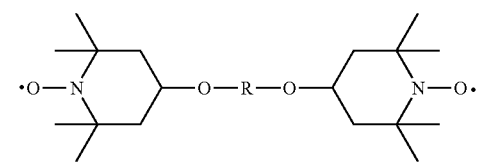
wherein R represents a $C_1$–$C_{30}$ alkyl group or phenyl group
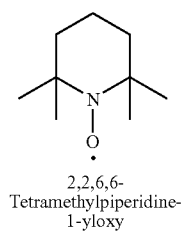
2,2,6,6-Tetramethylpiperidine-1-yloxy
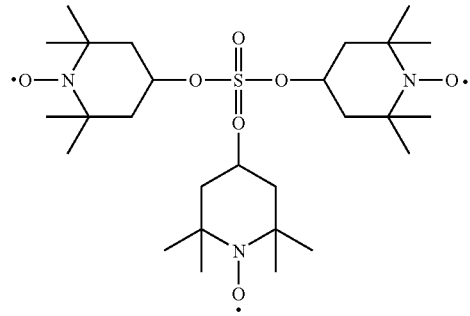
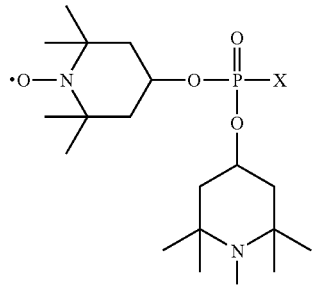
wherein X is Br or Cl
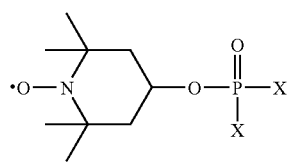
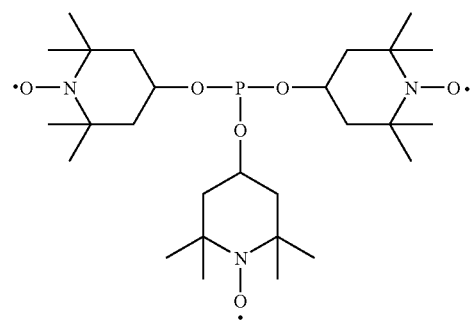
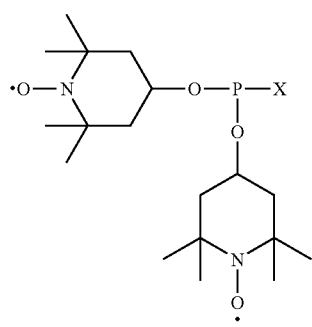
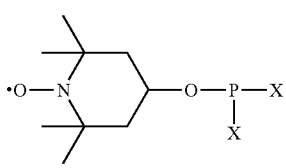
wherein X is Br or Cl -continued
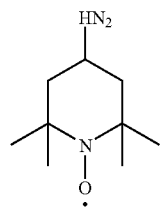
4-Amino-2,2,6,6-tetramethylpiperidinyloxy-TEMPO
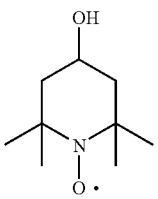
4-Hydroxy-TEMPO
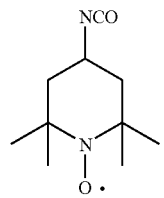
4-Isocyanate-TEMPO
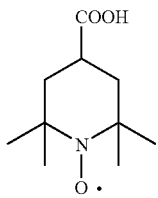
4-Carboxyl-TEMPO
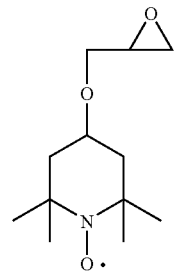
4-TEMPO-Glycidylether
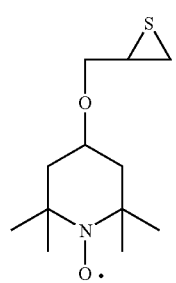
4-TEMPO-Thioglycidylether
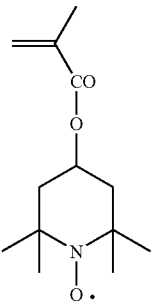
4-Methacrylate-TEMPO
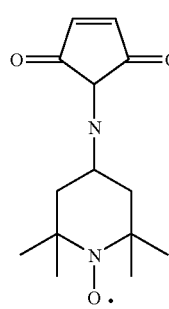
4-Maleimido-TEMPO
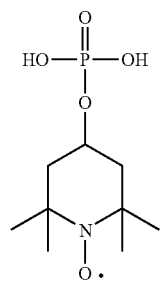
4-Phosphonoxy-TEMPO
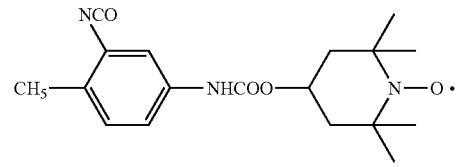
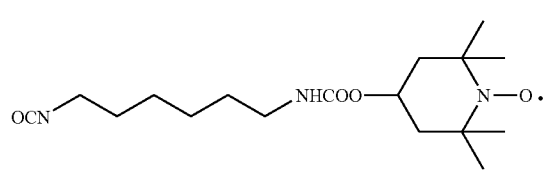
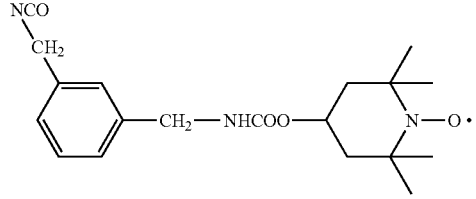
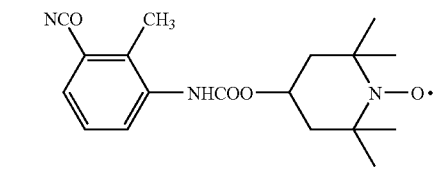
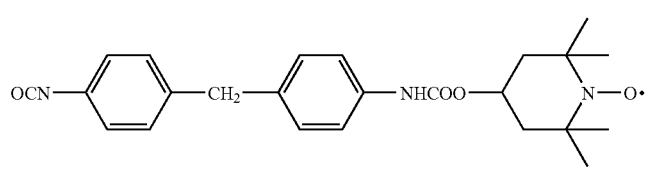
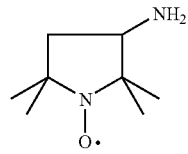
3-Amino-2,2,5,5-tetramethyl-1-pyroridinyloxy
(3-amino-PROXYL)
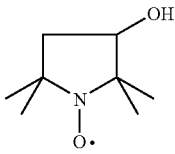
3-Hydroxy-PROXYL

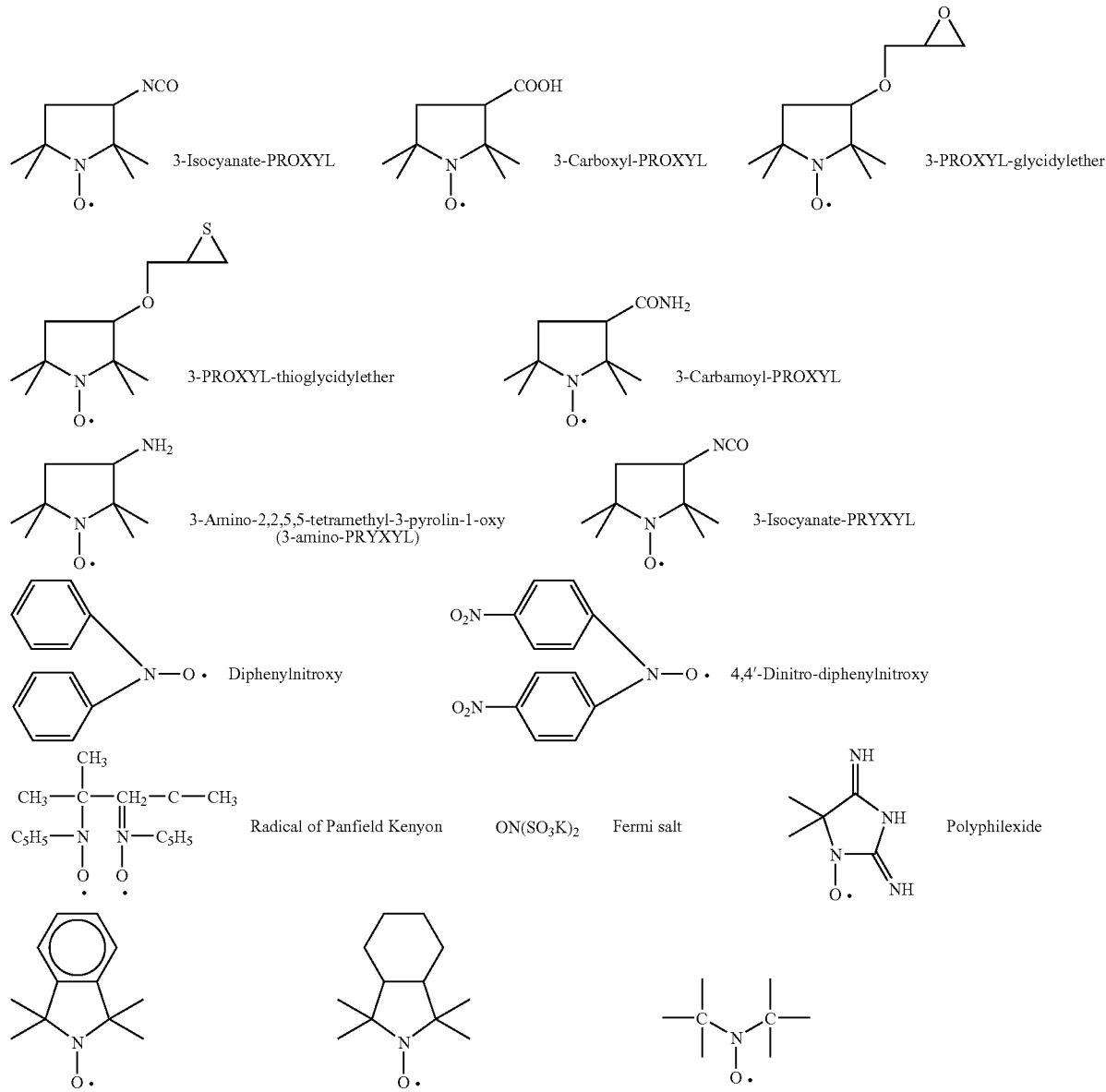

As the means for generating carbon radicals in the polymer, a radical initiator (C) is added to the reaction system. The radical initiator (C) usable in the present invention, include, for example, radical initiators such as benzoyl peroxide (BPO), t-butylperoxybenzoate (Z), dicumyl peroxide (DCP), t-butylcumyl peroxide (C), di-t-butyl peroxide (D), 2,5-dimethyl-2,5-di-t-butylperoxyhexane (2,5B), 2,5-dimethyl-2,5-di-t-butylperoxy-3-hexyne (Hexyne-3), 2,4-dichloro-benzoylperoxide (DC-BPO), di-t-butylperoxy-di-isopropylbenzene (P), 1,1-bis(t-butylperoxy)-3,3,5-trimethyl-cyclohexane (3M), n-butyl-4,4-bis(t-butylperoxy) valerate, 2,2-bis(t-butylperoxy)butane, or other organic peroxides, and azodicarbonamide (ADCA), azobisisobutylonitrile (AIBN), 2,2'-azobis-(2-amidinopropane)dihydrochloride, dimethyl2,2'-azobis(isobutyrate), azobis-cyan valeric acid (ACVA), 1,1'-azobis-(cyclohexane-1-carbonitrile) (ACHN), 2,2'-azobis-(2,4-dimethylvaleronitrile) (ADVN), azobismethyl butylonitrile (AMBN), 2,2'-azobis-(4-methoxy-2,4-dimethylvaleronitrile). These radical initiators can generate carbon radicals in a polymer by the addition thereof to a reaction system (mixture system or catalyzation system) of the polymer and a compound having such nitroxide radicals. The amount of the radical initiator (C) added is preferably, based upon 100 parts by weight of the polymer (A), 0.1 to 15 parts by weight, more preferably 0.2 to 10 parts by weight.

The ratio of the amounts of addition of the compound (B) having a nitroxide radical in the molecule thereof and the radical initiator (C) is preferably a molar ratio (B)/(C) of at least 0.7, preferably 0.75 to 1.3. If this ratio is less than 0.7, the degradation of the polymer chains during the modification will not be able to be suppressed and the molecular weight may decrease, and therefore, this is not preferable. According to the present invention, with a molar ratio (B)/(C) of 0.7 to less than 1.5, it is possible to introduce functional groups with a relatively high introduction rate.

With a molar ratio (B)/(C) of 1.5 or more, more preferably 1.7 to 2.0, the decrease in molecular weight can be completely suppressed.

According to the present invention, the organic groups introduced into the polymer by the modification of the polymer include, for example, a $C_1$ to $C_{30}$ alkyl group, phenyl group, allyl group, amino group, isocyanate group, hydroxyl group, thiol group, vinyl group, epoxy group, thiirane group, carboxyl group, carbonyl group-containing group (e.g., cyclic acid anhydrides such as, succinate anhydride, maleic anhydride, glutanic anhydride, phthalic anhydride), an amide group, ester group, imide group, nitrile group, thiocyan group, $C_1$ to $C_{20}$ alkoxy group, silyl group, alkoxysilyl group, etc.

When producing a polymer composition according to the present invention, in addition the modified polymer, polymers such as a diene-based rubber, polyolefin-based rubber, thermoplastic TPE, polyolefin, thermoplastic resin, heat curing resin; reinforcing filler such as carbon black or silica; fillers such as calcium carbonate, talc; vulcanization or cross-linking agents, vulcanization or cross-linking accelerators, various oils, antioxidants, plasticizers; coupling agents such as silane coupling agents, titanate-based coupling agents, or other various additives generally compounded for tire use or other general rubber use or thermoplastic polymer use may be compounded. The formulations are mixed and vulcanized to obtain compositions by general methods and can be used for vulcanization or cross-linking. The amounts of these additives may be compounded in the general amounts conventionally used, so far as the objects of the present invention are not adversely affected.

EXAMPLES

Examples will now be illustrated to further explain the present invention, but, of course, the scope of the present invention is not limited to these Examples.

Examples 1 to 5 and Comparative Examples 1 to 3
Synthesis of 4-Glycidyl-TEMPO To 250 ml of a 50 wt % of an aqueous sodium hydroxide solution, 171.6 g (1.85 mol) of epichlorohydrin and 8.11 g (0.0264 mol) of ammonium tetrabutyl hydrogen sulfate were added and stirred. At 0° C., 100.3 g (0.580 mol) of OH-TEMPO was gradually added thereto. The mixture was stirred at room temperature for 24 hours and, then, the reaction solution was poured into ice water. The aqueous layer was extracted with diethyl ether (200 ml×3 times), while the organic layer was washed with water (200 ml×3 times) followed by drying over magnesium sulfate. The resultant product was filtered, concentrated in vacuo, then purified by silica gel column chromatography to obtain the desired 4-glycidyl-TEMPO in the form of a syrup.

Modification of Butyl Rubber

A butyl rubber, radical initiator, a 2,2,6,6-tetramethylpiperidinyl-1-oxy derivative (OH-TEMPO, G-TEMPO) or GMA were placed in each of the weights shown in Table I in an internal Banbury mixer set to a temperature of 60° C. and mixed for 15 minutes. The mixture obtained was mixed in an internal Banbury mixer set to a temperature of 100° C., while replacing the atmosphere with nitrogen. During the mixing, the temperature was increased to the temperature shown in Table I and the mixing continued as is for 15 minutes. Part of the polymer obtained was dissolved in toluene and the polymer isolated and purified by a reprecipitation operation. Using the purified product, $^1$H-NMR analysis and elemental analysis were carried out to calculate the introduction ratio. Further, the molecular weight was measured by gel permeation chromatography (GPC). The results are shown in Table II.

TABLE I

Formulations of Modified Butyl Rubber (Parts by Weight)

| | Butyl rubber*[1] | Radical initiator | | OH-TEMPO*[4] | G-TEMPO*[5] | GMA*[6] | Temp. (° C.) |
|---|---|---|---|---|---|---|---|
| Comp. Ex. 1 | 100 | DCP*[2] | 2.7 | — | — | — | 175 |
| Comp. Ex. 2 | 100 | DCP*[2] | 2.7 | 0.8 | — | — | 175 |
| Comp. Ex. 3 | 100 | DBP*[3] | 6.5 | — | — | 7.6 | 185 |
| Ex. 1 | 100 | DCP | 2.7 | 3.4 | — | — | 175 |
| Ex. 2 | 100 | DCP | 2.7 | 8.6 | — | — | 175 |
| Ex. 3 | 100 | DBP | 6.5 | 9.2 | — | — | 185 |
| Ex. 4 | 100 | DBP | 6.5 | — | 12.2 | — | 185 |
| Ex. 5 | 100 | DBP | 8.7 | 9.2 | — | — | 165 |

*[1]Butyl 301 made by Bayer
*[2]Dicumyl peroxide made by NOF (Percumyl D)
*[3]Di-t-butylperoxide made by NOF (Perbutyl D)
*[4]4-hydroxy-2,2,6,6-tetramethylpiperidinyl-1-oxyl made by Asahi Denka Co. (LA7RD)
*[5]4-glycidyl-2,2,6,6-tetramethylpiperidinyl-1-oxyl (4-glycidyl-TEMPO synthesized above)
*[6]Glycidyl methacrylate made by Kanto Kagaku

TABLE II

| | TEMPO/Radical initiator (molar ratio) | Weight average molecular weight | Introduction rate (mol %) |
|---|---|---|---|
| Comp. Ex. 1 | 0 | 194000 | — |
| Comp. Ex. 2 | 0.5 | 299000 | 0.22 |
| Comp. Ex. 3 | 0 | 104000 | 0.11 |
| Ex. 1 | 2.0 | 503000 | 0.15 |
| Ex. 2 | 5.0 | 524000 | 0.16 |
| Ex. 3 | 1.2 | 567000 | 0.47 |
| Ex. 4 | 1.2 | 565000 | 1.27 |
| Ex. 5 | 0.9 | 410000 | 0.79 |
| Unmodified butyl rubber | 0 | 494000 | — |

Figure 2:
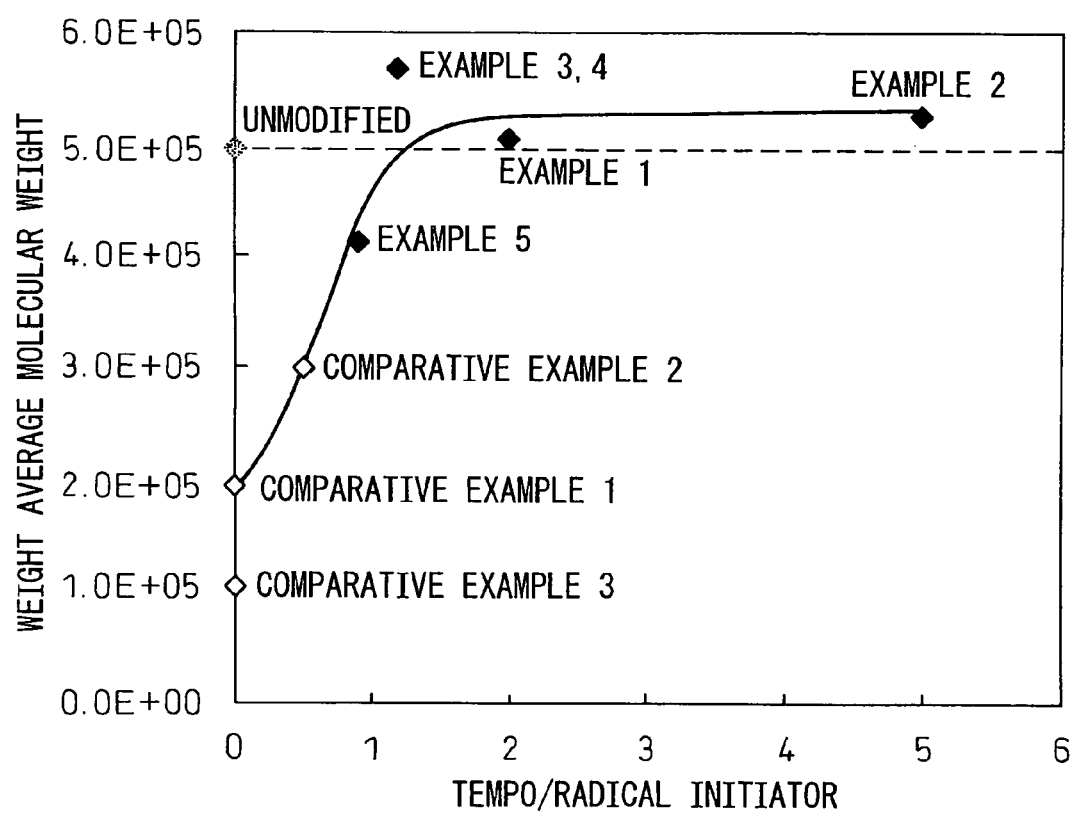
FIG. 2 is a graph of the relationship between the TEMPO/radical initiator ratio and the weight average molecular weight of the modified polymers of Examples 1 to 5 and Comparative Examples 1 to 3.

As will be clear from the results shown in Table II, in Comparative Examples 1 and 3 not using TEMPO and in Comparative Example 2 having a molar ratio of TEMPO/radical initiator of less than 0.7, the decreases in the molecular weight were remarkable, while in Examples 1 to 5 with ratios of 0.7 or more, no decreases in the molecular weights could be observed. The results are also shown in FIG. 2.

Examples 6 to 9 and Comparative Examples 4 to 6

In each of the formulations (parts by weight) shown in Table III, the ingredients other than the vulcanization accelerator and sulfur were mixed by a 70 cc Brabender mixer for 5 minutes. The master batch obtained and vulcanication and sulfur were mixed in an 8-inch open roll to obtain a rubber composition. The rubber composition was measured for vulcanization degree according to JIS K6300 to evaluate the vulcanization properties (Table III). The values of T5 to T95 show the times required for reaching vulcanization degrees of 5% to 95%, while MH shows the maximum torque at the time of measurement.

15 minutes. The mixture obtained was mixed in an internal Banbury mixer set to a temperature of 100° C. for 5 minutes, while replacing the atmosphere with nitrogen. While mixing, the temperature was increased to 186° C. and the mixture further mixed for 15 minutes. Part of the polymer obtained was dissolved in toluene and the polymer isolated and purified by a reprecipitation operation. The purified product was used for $^1$H-NMR analysis to confirm the introduction.

2. Modification with Glycidyl-TEMPO 350.0 g of butyl rubber (Butyl 301, made by Bayer), 22.8 g of di-t-butyl peroxide and 42.3 g of 4-glycidyl-2,2,6,6-tetramethylpiperidinyl-1-oxy were placed in an internal Banbury mixer set to a temperature of 60° C. and mixed for 15 minutes. The mixture obtained was mixed in an internal

TABLE III

|  | Comp. Ex. 4 | Comp. Ex. 5 | Ex. 6 | Ex. 7 | Comp. Ex. 6 | Ex. 8 | Ex. 9 |
|---|---|---|---|---|---|---|---|
| Formulation (parts by weight) | | | | | | | |
| Butyl rubber*[1] | 100 | — | — | — | 100 | — | — |
| Brominated butyl rubber*[2] | — | 100 | — | — | — | — | — |
| OHT-IIR*[3] | — | — | 100 | — | — | 100 | — |
| GET-IIR*[4] | — | — | — | 100 | — | — | 100 |
| Carbon black*[5] | 60 | 60 | 60 | 60 | 60 | 60 | 60 |
| Stearic acid*[6] | 1.0 | 1.0 | 1.0 | 1.0 | 1.0 | 1.0 | 1.0 |
| Sulfur*[7] | 1.5 | 1.5 | 1.5 | 1.5 | 1.5 | 1.5 | 1.5 |
| Vulcanization accelerator 1*[8] | 1.1 | 1.1 | 1.1 | 1.1 | — | — | — |
| Vulcanization accelerator 2*[9] | 1.0 | 1.0 | 1.0 | 1.0 | — | — | — |
| Zinc white*[10] | 5.0 | 5.0 | 5.0 | 5.0 | — | — | — |
| Evaluation of vulcanization properties at 148° C. | | | | | | | |
| T5 (min) | 13.0 | 3.7 | 2.4 | 6.2 | 5.4 | 3.0 | 2.5 |
| T30 (min) | 21.0 | 8.7 | 7.3 | 10.9 | 34.7 | 6.8 | 7.3 |
| T50 (min) | 24.9 | 11.7 | 15.0 | 16.2 | — | 11.4 | 14.1 |
| T95 (min) | 54.2 | 48.2 | 51.6 | 52.4 | — | 37.5 | 44.8 |
| MH | 0.68 | 0.72 | 0.79 | 0.83 | 0.38 | 0.49 | 0.44 |
| at 160° C. | | | | | | | |
| T5 (min) | 5.8 | 2.5 | 1.4 | 3.1 | 2.5 | 1.6 | 1.3 |
| T30 (min) | 9.4 | 4.4 | 3.6 | 5.3 | 11.6 | 3.0 | 2.8 |
| T50 (min) | 12.4 | 6.1 | 7.3 | 8.3 | — | 4.3 | 4.6 |
| T95 (min) | 47.7 | 36.0 | 30.8 | 39.8 | — | 13.0 | 14.7 |
| MH | 0.83 | 0.79 | 0.82 | 0.89 | 0.35 | 0.45 | 0.41 |

*[1]Butyl 301 made by Bayer
*[2]Bayer Bromobutyl X2 made by Bayer
*[3]See following synthesis example (OH-TEMPO modification)
*[4]See following synthesis example (glycidyl-TEMPO modification)
*[5]HTC#G made by Nippon Steel Chemical Carbon Co., Ltd.
*[6]Beads Stearic Acid made by NOF
*[7]Gold Flower Brand Fine Powder Sulfur (150 mesh) made by Tsurumi Chemical Industrial Co., Ltd.
*[8]Sanceler DM made by Sanshin Chemical Industry Co., Ltd.
*[9]Nocceler TOTN made by Ouchi Shinko Chemical Industrial Co., Ltd.
*[10]Zinc White Type 8 made by Seido Chemical Industry Co., Ltd.

Synthesis Example of Modified Butyl Rubber

1. Modification with OH-TEMPO 350.0 g of butyl rubber (Butyl 301, made by Bayer), 22.8 g of di-t-butyl peroxide and 32.2 g of 4-hydroxy-2,2,6,6-tetramethylpiperidinyl-1-oxy were placed in an internal Banbury mixer set to a temperature of 60° C. and mixed for Banbury mixer set to a temperature of 100° C. for 5 minutes, while replacing the atmosphere with nitrogen. While mixing, the temperature was increased to 186° C. and the mixture further mixed for 15 minutes. Part of the polymer obtained was dissolved in toluene and the polymer isolated and purified by a reprecipitation operation. The purified product was used for $^1$H-NMR analysis to confirm the introduction.

Examples 10 to 13 and Comparative Examples 7 to 9

As shown in Table IV, polypropylene (PP), a radical initiator (t-BPO) and 4-hydroxy-2,2,6,6-tetramethylpiperidinyl-1-oxy (OH-TEMPO) were weighed in a flask according to each of the formulations shown in Table IV, 20 ml of t-butylbenzene was inserted, as a solvent, and the mixture was allowed to react in a nitrogen atmosphere at 153° C. for 3.5 hours. The solution including the reaction product was added dropwise to methanol so as to separate the unreacted 4-hydroxy-2,2,6,6-tetramethylpiperidinyl-1-oxy (OH-TEMPO) and t-butylbenzene from the polymer. The polymer obtained was dried in vacuo at 60° C. for about 20 hours. The results are shown in Table V.

TABLE IV

|  | PP*[1] | OH-TEMPO*[2] | | t-BPO*[3] | | OH-TEMP/t-BPO |
|---|---|---|---|---|---|---|
|  | g | g | mol | g | mol | — |
| Ex. 10 | 2.002 | 0.1646 | 9.57E−04 | 0.1033 | 7.08E−04 | 1.35 |
| Ex. 11 | 2.000 | 0.1648 | 9.58E−04 | 0.1445 | 9.90E−04 | 0.97 |
| Ex. 12 | 2.009 | 0.1847 | 1.07E−03 | 0.2127 | 1.46E−03 | 0.74 |
| Ex. 13 | 2.004 | 0.1543 | 8.97E−04 | 0.1855 | 1.27E−03 | 0.71 |
| Comp. Ex. 7 | 2.001 | 0.1645 | 9.56E−04 | 0.2758 | 1.89E−03 | 0.51 |
| Comp. Ex. 8 | 2.004 | 0.1643 | 9.55E−04 | 0.4024 | 2.76E−03 | 0.35 |
| Comp. Ex. 9 | 2.501 | 0.1645 | 9.56E−04 | 0.0000 | 0.00E+00 | — |

*[1]Sunallomer PMC20M (made by Sunallomer Ltd.)
*[2]4-hydroxy-2,2,6,6-tetramethylpiperidinyl-1-oxyl (made by Asahi Denka Co.)
*[3]Tertiary butyl peroxide (made by NOF)

TABLE V

|  | Amount of graft of OH-TEMPO mol % | Mw $10^4$ g/mol |
|---|---|---|
| Ex. 10 | 0.30 | 19.1 |
| Ex. 11 | 0.14 | 17.4 |
| Ex. 12 | 0.39 | 17.8 |
| Ex. 13 | 0.31 | 16.9 |
| Comp. Ex. 7 | 0.32 | 4.91 |
| Comp. Ex. 8 | 0.32 | 22.1 |
| Comp. Ex. 9 | 0.00 | 17.4 |
| PP before modification | — | 17.0 |

Note that the method of measurement of the amount of grafting of the OH-TEMPO shown in Table V is as follows:

Elemental analysis was used to measure the amount (wt %) of the nitrogen atoms contained in the modified polymer, then the number of OH-TEMPO contained per 100 propylene units was found from this value assuming the polymer composition to be 100% polypropylene, and the result was indicated as mol %.

According to the present invention, by modifying a polymer by the reaction with a compound having a nitroxide radical in the molecule thereof, without lowering the molecular weight, it is possible to improve the bondability and wettability of, for example, a butyl rubber, EPM, etc. and to use the modified product effectively for rubber products such as tires, conveyor belts, hoses, and also as plastic products. According to the present invention, it is further possible to obtain vulcanization activity equal to that of a halogenated butyl rubber by modification of a nonhalogenated butyl rubber by reaction with a compound having a nitroxide radical in the molecule thereof.

The invention claimed is:

1. A process for modifying a polymer comprising modifying the polymer (A) capable of decomposing by carbon radicals present in said polymer (A) using a compound (B) having an organic group and a nitroxide radical in said compound (B), and a radical initiator (C) in a ratio of (B)/(C) (molar ratio) of at least 0.7, whereby the organic group derived from the nitroxide radicals of said compound (B) is introduced into the polymer (A).

2. A process for modifying the polymer as claimed in claim 1, wherein said molar ratio (B)/(C) is at least 1.5.

3. A process for modifying the polymer as claimed in claim 1, wherein said polymer (A) has isomonoolefin units in its constituent units.

4. A process for modifying the polymer as claimed in claim 1, wherein said polymer (A) is a butyl rubber.

5. A process for modifying the polymer as claimed in claim 1, wherein said polymer (A) is a polymer comprising propylene units.

6. A process for modifying the polymer as claimed in claim 1, wherein said organic group is an organic functional group.

7. A process for modifying the polymer as claimed in claim 6, wherein said organic functional group is a $C_1$ to $C_{30}$ alkyl group, phenyl group, allyl group, amino group, isocyanate group, hydroxyl group, thiol group, vinyl group, epoxy group, thiirane group, carboxyl group, carbonyl group-containing group, amide group, ester group, imide group, nitrile group, thiocyan group, $C_1$ to $C_{20}$ alkoxy group, silyl group or alkoxysilyl group.

* * * * *